United States Patent
Kawamura

[11] Patent Number: 6,079,373
[45] Date of Patent: Jun. 27, 2000

[54] GAS ENGINE WITH A GAS FUEL REFORMING DEVICE

[75] Inventor: Hideo Kawamura, Kanagawa-ken, Japan

[73] Assignee: Isuzu Ceramics Research Institute Co., Ltd., Kanagawa-ken, Japan

[21] Appl. No.: 09/075,956

[22] Filed: May 12, 1998

[30] Foreign Application Priority Data

| May 13, 1997 | [JP] | Japan | 9-137484 |
| Jun. 20, 1997 | [JP] | Japan | 9-179124 |

[51] Int. Cl.[7] ................................................. F02B 43/08
[52] U.S. Cl. ........................ 123/3; 123/527; 123/DIG. 12
[58] Field of Search ........................ 123/3, 527, DIG. 12

[56] References Cited

U.S. PATENT DOCUMENTS

| 4,059,076 | 11/1977 | Kosaka et al. . | |
| 4,306,526 | 12/1981 | Schaub et al. . | |
| 4,716,859 | 1/1988 | Konig et al. | 123/3 |
| 4,735,186 | 4/1988 | Parsons | 123/3 |
| 4,840,777 | 6/1989 | Faucher . | |
| 5,143,025 | 9/1992 | Munday | 123/DIG. 12 |
| 5,343,699 | 9/1994 | McAlister | 123/3 |
| 5,488,932 | 2/1996 | Serafini | 123/3 |
| 5,899,175 | 5/1999 | Manikowski, Jr. et al. | 123/DIG. 12 |

FOREIGN PATENT DOCUMENTS

| 0141634 | 5/1985 | European Pat. Off. . |
| 0595473 | 5/1994 | European Pat. Off. . |
| 0843082 | 5/1998 | European Pat. Off. . |
| 4331508 | 10/1994 | Germany . |
| 6-101495 | 4/1994 | Japan . |
| 6-108865 | 4/1994 | Japan . |

Primary Examiner—John Kwon
Attorney, Agent, or Firm—Browdy and Neimark

[57] ABSTRACT

The gas engine with a gas fuel reforming device thermally decomposes $CH_4$, a major component of natural gas, into a reformed fuel of CO and $H_2$ to increase the heat produced and thereby reduce the $CO_2$ content in the exhaust gas and prevent the formation of $NO_x$. The gas engine mixes $CH_4$ with $CO_2$ and sends the gas mixture to the catalyst reactor installed in the exhaust passage where the gas mixture is thermally decomposed into a reformed fuel by using the thermal energy of the exhaust gas. $CO_2$ is extracted from the exhaust gas by the $CO_2$ supply device which in turn sends the $CO_2$ to the catalyst reactor. The $CO_2$ supply device comprises a $CO_2$ dissolving device that accommodates a solution to dissolve $CO_2$ of low-temperature exhaust gas and a $CO_2$ delivery device installed in the exhaust passage through which high-temperature exhaust gas flows and adapted to release $CO_2$ from the solution supplied from the $CO_2$ dissolving device. The $CO_2$ supply device can be formed of a $CO_2$ separation membrane that separates $CO_2$ from the exhaust gas.

22 Claims, 5 Drawing Sheets

GAS ENGINE WITH A GAS FUEL REFORMING DEVICE

BACKGROUND OF THE INVENTION

1. Field of the Invention

The present invention relates to a gas engine having a gas fuel reforming device that reforms a gas fuel such as natural gas with a thermal energy of exhaust gas to enhance the thermal efficiency.

2. Description of the Prior Art

Gas engines using natural gas as a main fuel are being developed as cogeneration systems. The cogeneration system extracts power in the form of electric energy by a generator and also heats water with the heat of the exhaust gas by a heat exchanger to produce hot water for use in a hot-water-supply system.

Engines using natural gas as a fuel includes, for example, Japanese Patent Laid-Open No. 108865/1994 and 101495/1994.

The cogeneration type gas engine disclosed in Japanese Patent Laid-Open No. 108865/1994 passes exhaust gas through a turbocharger, an energy recovery device and a steam generation device to reduce the exhaust gas temperature and then uses the reduced temperature exhaust gas in an exhaust gas recirculation (EGR) system to reduce $NO_x$ emissions. It also drives the turbocharger with the exhaust gas from a heat insulating type gas engine and, by using exhaust gas from the turbocharger, drives the energy recovery device having a generator. The cogeneration type gas engine sends the exhaust gas from the energy recovery device to the steam generation device of the heat exchanger where water is converted into steam, which is then used to drive a steam turbine to recover electric energy.

The multicylinder gas engine disclosed in Japanese Patent Laid-Open No. 101495/1994 provides a turbocharger to each group of two cylinders that are not consecutive in the ignition order, with first and fourth cylinders connected to one of exhaust manifolds and second and third cylinders connected to the other manifold. The both exhaust manifolds are provided with a water nozzle from which to spout water. The water spouted from the nozzles into the exhaust manifolds is vaporized in the exhaust passage and converted into steam, increasing the gas flow and driving the turbocharger.

In the gas engine when the combustion chambers are made of ceramics and constructed in a heat insulating structure, the air compression temperature increases to more than a self-ignition temperature of the natural gas, obviating an ignition device. Further, precombustion chambers, in which fuel is introduced, are provided in the gas engine in addition to the main combustion chambers in which air is introduced, and a control valve is installed between the main combustion chamber and the precombustion chamber to offer a diesel-cycle-based cogeneration engine with high efficiency. The exhaust gas of the gas engine, when the combustion chamber is constructed in a heat insulating structure, reaches as high a temperature as 850° C. It is thus possible to recover thermal energy from the high-temperature exhaust gas to improve the heat efficiency of the engine.

The natural gas is known to have methane $CH_4$ as its major component. Methane as a fuel has a high calorific value and occurs abundantly in the natural environment and thus expectations are growing for methane to become a future replacement fuel for oil. Methane, when reformed by thermal decomposition through a catalyst, is transformed into carbon monoxide CO and hydrogen $H_2$ and the calorific values of CO and $H_2$ are greater than that of $CH_4$. When used in engines, methane improves the thermal efficiency, contributing to the conservation of resources and the reduction of $CO_2$ emissions.

The calorific values of methane $CH_4$, carbon monoxide CO and hydrogen $H_2$ as fuels are as follows:

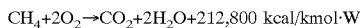
$$CH_4+2O_2 \rightarrow CO_2+2H_2O+212{,}800 \text{ kcal/kmol·W}$$

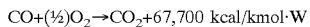
$$CO+(\tfrac{1}{2})O_2 \rightarrow CO_2+67{,}700 \text{ kcal/kmol·W}$$

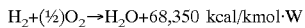
$$H_2+(\tfrac{1}{2})O_2 \rightarrow H_2O+68{,}350 \text{ kcal/kmol·W}$$

When on the other hand $CH_4$ is reformed by using a catalyst and the thermal energy of exhaust has, the calorific value of the fuel increases.

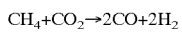
$$CH_4+CO_2 \rightarrow 2CO+2H_2$$

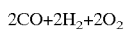
$$2CO+2H_2+2O_2$$

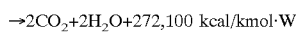
$$\rightarrow 2CO_2+2H_2O+272{,}100 \text{ kcal/kmol·W}$$

SUMMARY OF THE INVENTION

The object of this invention is to solve the above problems and to provide a gas engine with a natural gas reforming device which reforms a gas fuel such as natural gas, particularly $CH_4$, by mixing $CH_4$ with $CO_2$ and converting the gas mixture into CO and $H_2$ with the aid of a catalyst by using the thermal energy of the exhaust gas to improve the thermal efficiency and which uses $CO_2$ of the exhaust gas in reforming $CO_2$ to reduce $CO_2$ emissions and also reduces the amount of $NO_x$ produced.

This invention relates to a gas engine with a gas fuel reforming device, which comprises: a fuel tank containing a natural gas fuel having $CH_4$ as a major component; an exhaust passage to discharge exhaust gas from combustion chambers; a catalyst reactor installed in the exhaust passage to thermally decompose a gas mixture of $CH_4$ and $CO_2$ into a reformed fuel of CO and $H_2$ by using thermal energy of the exhaust gas; a gas fuel supply device to supply the natural gas fuel from the fuel tank to the catalyst reactor; a $CO_2$ supply device to supply $CO_2$ separated from the exhaust gas to the catalyst reactor; and a reformed fuel supply device to supply the reformed fuel to the combustion chambers.

The $CO_2$ supply device comprises: a $CO_2$ dissolving device containing a solution to dissolve $CO_2$ of a cooled, low-temperature exhaust gas; a $CO_2$ delivery device installed in the exhaust passage through which high-temperature exhaust gas discharged from the combustion chambers flows, the $CO_2$ delivery device being able to release $CO_2$ from the solution, in which $CO_2$ was dissolved by the $CO_2$ dissolving device, by heating the solution with the high-temperature exhaust gas, the $CO_2$ delivery device being able to accommodate the solution and send the released $CO_2$ to the catalyst reactor; and a circulation pump to circulate the solution between the $CO_2$ dissolving device and the $CO_2$ delivery device.

A solvent in the $CO_2$ dissolving device that absorbs $CO_2$ of the exhaust gas is β-aminoethyl alcohol and the solution in the $CO_2$ delivery device that releases $CO_2$ is β-oxyethyl ammonium. Alternatively, the solvent for dissolving $CO_2$ may use diethanolamine.

The $CO_2$ dissolving device dissolves $CO_2$ of the exhaust gas in a solvent to form a solution and releases $N_2$ and $H_2O$ (water vapor at 100° C. or higher) of the exhaust gas out into the atmosphere. Hence, only $N_2$ and $H_2O$ of the exhaust gas are released into the atmosphere, making the exhaust gas very clean and environmentally friendly and contributing to a reduction in the air pollution. A large amount of $CO_2$ introduced into the fuel minimizes the formation of $NO_x$.

Alternatively, the $CO_2$ supply device supplies to the catalyst reactor $CO_2$ which was separated from the exhaust gas by a $CO_2$ separation membrane arranged in the exhaust passage through which low-temperature exhaust gas flows. The $CO_2$ separation membrane is a polytetrafluoroethylene membrane or a polytetrafluoroethylene membrane bonded with ethylenediamine to enhance a $CO_2$ filtering performance. Or the $CO_2$ separation membrane is an inorganic separation membrane made of alumina-, silica- and zeolite-based porous ceramics.

The catalyst reactor uses Ni or Pt as a catalyst to cause $CH_4$ to react with $CO_2$ to thermally decompose them into CO and $H_2$. The catalyst reactor is a heat exchanger installed in the exhaust passage and has an exhaust gas passage through which the exhaust gas flows and a gas fuel passage containing porous members coated at their surfaces with the catalyst, the catalyst being incorporated inside a separation wall of the exhaust gas passage.

This gas engine has a turbocharger installed in the exhaust passage downstream of the catalyst reactor and an energy recovery turbine installed in the exhaust passage downstream of the turbocharger and driven by the exhaust gas and/or steam. The gas engine also has a heat exchanger installed in the exhaust passage downstream of the energy recovery turbine to produce steam.

The temperature of the exhaust gas discharged from the combustion chambers is at around 900–800° C. in the catalyst reactor and is reduced about 150° C. by the turbocharger, about 200° C. by the energy recovery turbine and further about 350° C. by the heat exchanger. Hence, the exhaust gas blown into the $CO_2$ dissolving device can be lowered in temperature down to about 100° C. so that β-aminoethyl alcohol in the $CO_2$ dissolving device can dissolve $CO_2$ well.

The combustion chambers are formed in a heat insulating structure of ceramic members. Wall surfaces of the combustion chambers are made of ceramic members, with a heat insulating layer formed on the outer side, to make the combustion chambers heat insulative. In this gas engine, the exhaust gas discharged from the combustion chambers is high-temperature exhaust gas at around 900° C. The high-temperature exhaust gas, after being discharged from the combustion chambers into the exhaust passage, decomposes the gas mixture of $CH_4$ and $CO_2$ into CO and $H_2$ with the aid of catalyst, thus enhancing the thermal efficiency.

This gas engine mixes $CH_4$, the major component of the natural gas, with $CO_2$ and thermally decomposes the gas mixture into a reformed fuel of CO and $H_2$ with the aid of the catalyst by using the thermal energy of the exhaust gas. As a result, 272,100/212,800=2.8, which translates to a roughly 30% increase in the heat produced, contributing to a substantial improvement in thermal efficiency.

The amount of heat produced when the natural gas is converted into a reformed fuel is given as follows for 1 kg·W.

$$CH_4 + 2O_2 \rightarrow CO_2 + 2H_2O + 13{,}300 \text{ kcal/kg·W}$$

$$CH_4 + CO_2 \rightarrow 2CO + 2H_2$$

$$2CO + 2H_2 + 2O_2 \rightarrow 2CO_2 + 2H_2O + 17{,}000 \text{ kcal/kg·W}$$

Methane gas ($CH_4$) reacts with carbon dioxide ($CO_2$) with the aid of the catalyst such as nickel (Ni) and platinum (Pt) and the thermal energy of the exhaust gas and is thermally decomposed into carbon dioxide (CO) and hydrogen ($H_2$). The above decomposition reaction uses the thermal energy of the exhaust gas for thermal decomposition and produces CO and $H_2$ which have a large calorific value. That is, in the above decomposition reaction, passing methane gas over the catalyst such as Ni and Pt heated to more than about 800° C. results in the thermal decomposition reaction, in which carbon dioxide is decomposed into carbon monoxide and methane into CO and $H_2$.

As described above, this gas engine mixes $CH_4$, the main component of the natural gas, with $CO_2$ contained in the exhaust gas, passes the gas mixture through the catalyst and heats them to high temperatures more than about 800° C. by using the thermal energy of the exhaust gas to convert $CH_4$ into CO and $H_2$ and thereby increase the amount of heat produced. The exhaust gas released from the gas engine out into the atmosphere contains $N_2$ and $H_2O$ gases with $CO_2$ removed, and thus does not pollute air or deteriorate environment.

The thermal energy of the exhaust gas, after being used for thermal decomposition of $CH_4$, is recovered by the turbocharger, the energy recovery turbine and the heat exchanger. In other words, the gas engine drives the turbocharger with the heat energy of the exhaust gas; the exhaust gas discharged from the turbine of the turbocharger in turn drives the energy recovery turbine equipped with a generator; the heat energy of the exhaust gas from the energy recovery turbine generates steam by the heat exchanger; and the steam thus produced drives the steam turbine of the energy recovery turbine to drive the generator to produce electricity as a recovered energy.

This gas engine, compared with a conventional gas engine using natural gas, can improve its thermal efficiency by about 28% theoretically, i.e., enhancing the thermal efficiency, which is 42% with the conventional gas engine, to 54%. With the turbocharger and the energy recovery turbine-both driven by the energy of the exhaust gas-installed in the exhaust passage, it is possible to secure the thermal efficiency of about 62%, a significant improvement over the conventional gas engine.

Further, this invention concerns a gas engine with a natural gas reforming device, which comprises: a fuel tank containing a natural gas fuel having $CH_4$ as a major component; a catalyst reactor installed in an exhaust passage to thermally decompose $CH_4$ supplied from the fuel tank into a reformed fuel by using exhaust gas discharged from combustion chambers; a reformed fuel supply device to supply the reformed fuel to the combustion chambers; a turbocharger installed in the exhaust passage downstream of the catalyst reactor; a first-stage heat exchanger installed in the exhaust passage downstream of the turbocharger; a steam turbine driven by steam generated by the first-stage heat exchanger; a condenser to convert steam discharged from the steam turbine into water; a second-stage heat exchanger installed in the exhaust passage downstream of the first-stage heat exchanger to convert water delivered from the condenser into steam and supply the steam to the first-stage heat exchanger; and a $CO_2$ supply device to separate $CO_2$ from the exhaust gas by a $CO_2$ separation membrane installed in the exhaust passage downstream of the second-stage heat exchanger and to supply the separated $CO_2$ to the catalyst reactor.

The $CO_2$ separation membrane is an inorganic separation membrane made of alumina-, silica- and zeolite-based porous ceramics. The $CO_2$ separation membrane is formed as a membrane of a porous ceramic body having small openings therein and high heat resistance. Taking advantage of the fact that the molecular diameter of $CO_2$ is smaller than those of $N_2$ and $O_2$ and also the molecular sieving effect, the $CO_2$ separation membrane can separate $CO_2$ from the exhaust gas. Further, the service temperature of the $CO_2$ separation membrane is high at 350° C. and thus can be effectively applied to this invention. At around 300° C. the $CO_2$ separation membrane is most activated and able to separate $CO_2$ well from the exhaust gas.

$CO_2$ that has not contributed to the thermal decomposition of $CH_4$ is supplied together with the reformed fuel to the combustion chambers. In each of the combustion chambers a gas mixture of $CH_4$, CO, $H_2$ and $CO_2$ is introduced into a precombustion chamber and, when the control valve is opened, is mixed with the compressed air from the main combustion chamber and burnt. In this process, the presence of $CO_2$ minimizes-the production of $NO_x$ to less than 100 ppm.

The first-stage heat exchanger comprises a steam passage installed in a first casing and containing porous ceramic members through which the steam heated by the second-stage heat exchanger flows, and an exhaust gas passage installed in the steam passage and containing porous ceramic members through which the exhaust gas flows.

The second-stage heat exchanger comprises a water-steam passage installed in a second casing provided adjacent to the first casing and containing porous ceramic members through which steam flows, the water-steam passage being capable of retaining water, and an exhaust gas passage arranged around the water-steam passage and containing porous ceramic members through which the exhaust gas from the first-stage heat exchanger flows.

The exhaust passage upstream of the first-stage heat exchanger is provided with a fuel nozzle that injects the reformed fuel from the catalyst reactor.

Because the fuel nozzle for injecting a part of the reformed fuel from the catalyst reactor is provided in the exhaust passage upstream of the first-stage heat exchanger, a small amount of fuel injected from the fuel nozzle is burned with $O_2$ contained in the exhaust gas to produce heat which increases the enthalpy of the exhaust gas, which is then transferred into the first-stage heat exchanger, thus improving the efficiency of the steam turbine.

The temperature of the exhaust gas discharged from the combustion chambers of the heat insulating structure is at around 900–800° C., for example, in the catalyst reactor, high enough to contribute to the thermal decomposition of $CH_4$. This temperature is reduced about 150° C. by the turbocharger, further about 200° C. by the first-stage heat exchanger and finally about 200° C. by the second-stage heat exchanger. Thus, with the exhaust gas, which is reduced to as low as about 350–250° C., delivered to the $CO_2$ separation device, it is possible to separate $CO_2$ well from the exhaust gas in the $CO_2$ separation device.

Further, because the high-temperature steam generated by the first-stage heat exchanger and the second-stage heat exchanger drives the steam turbine, there is no need to raise the inlet pressure of the first-stage heat exchanger like a gas turbine as is required by the conventional energy recovery device consisting of a gas turbine. That is, an increase in the inlet pressure of the gas turbine directly raises the back pressure during the exhaust stroke of the reciprocating engine, causing a large loss.

This gas engine uses the steam turbine to generate high-pressure steam by using the exhaust gas energy and convert the exhaust gas energy into electric energy without increasing the back pressure. The thermal efficiency can therefore be improved. The steam turbine, when constructed in a radial turbine, can be reduced in size and cost compared with an axial-flow turbine.

Because this gas engine mixes $CH_4$, the main component of natural gas, with $CO_2$ and thermally decomposes the gas mixture into a reformed fuel of CO and $H_2$ by using the thermal energy of the exhaust gas, the heat produced can be increased by about 38%, improving the thermal efficiency of the engine. The above decomposition reaction is a reaction in which the gas mixture of $CH_4$ and $CO_2$ is passed over the catalyst such as Ni and Pt and heated to over about 800° C. to perform thermal decomposition of $CO_2$ into carbon monoxide and $CH_4$ into CO and $H_2$. Because the combustion chambers are constructed in a heat insulating structure, the exhaust gas from the combustion chambers is in an elevated-temperature state as high as more than 800° C. ensuring smooth execution of the thermal decomposition reaction.

Assuming that this gas engine has a thermal efficiency of 42% in a diesel cycle, for example, the thermal efficiency is improved about 8% by the turbocharger with a generator and about 5% by the steam turbine. Further, the thermal decomposition of $CH_4$ into CO and $H_2$ increases the amount of heat produced by 1.38 times. With all these effects considered, the overall thermal efficiency of the gas engine can be expected to rise to 65.5% if the thermal decomposition rate of $CH_4$ is assumed to be 50%.

In this gas engine, the thermal energy of the exhaust gas, after contributing to the thermal decomposition of $CH_4$, is recovered by the turbocharger, the first-stage heat exchanger and the second-stage heat exchanger, all installed in the exhaust passage. In other words, in this gas engine, the turbocharger is driven by the thermal energy of the exhaust gas, the exhaust gas discharged from the turbine of the turbocharger is used to generate steam in the first-stage heat exchanger and the second-stage heat exchanger, and the steam thus generated is used to drive the steam turbine and therefore the generator of the steam turbine to produce electricity as a recovered energy.

DETAILED DESCRIPTION OF THE EMBODIMENTS

Now, by referring to the accompanying drawings, embodiments of the gas engine with the gas fuel reforming device according to this invention will be described.

Figure 1:
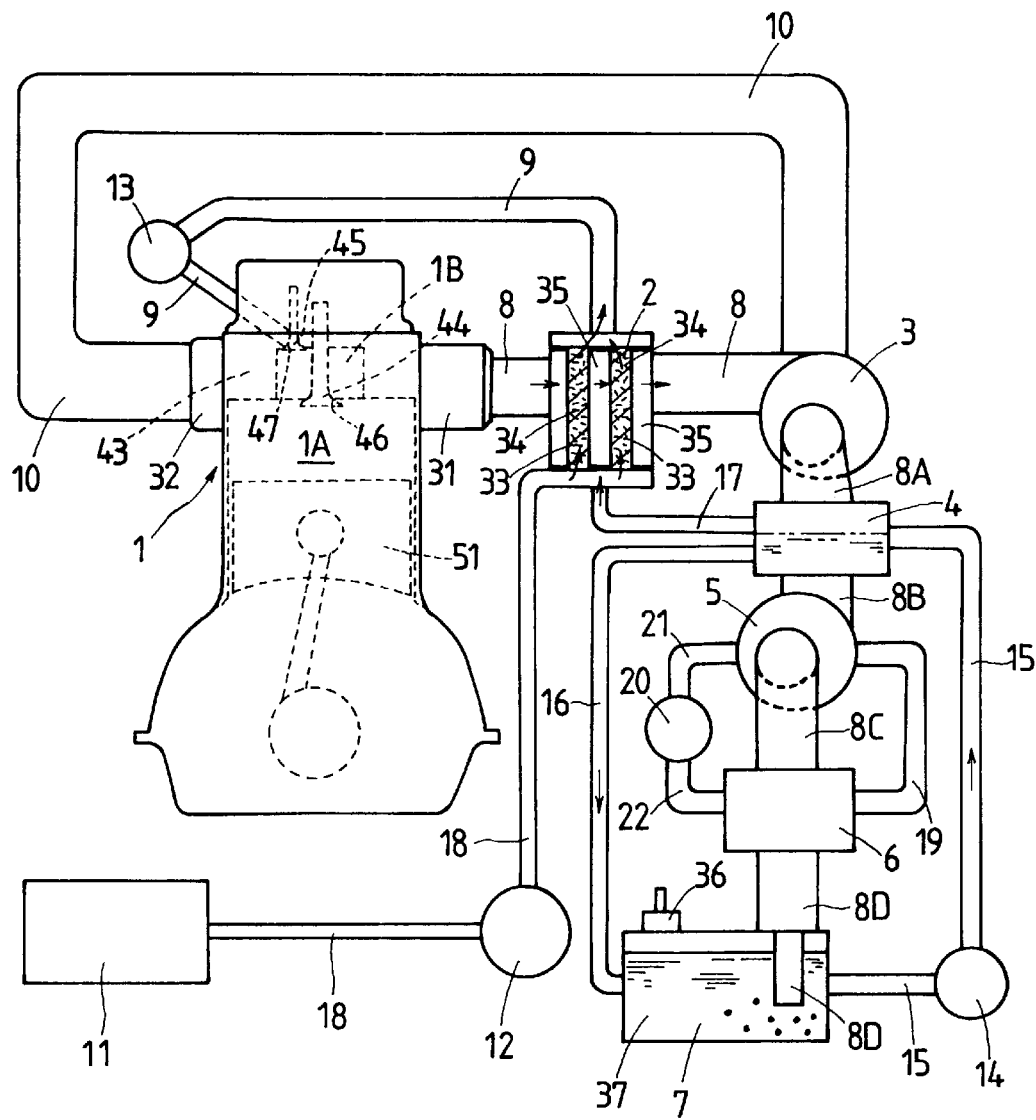
FIG. 1 is a schematic diagram showing one embodiment of the gas engine with a gas fuel reforming device of this invention.

First, the first embodiment of the gas engine with the gas fuel reforming device of this invention will be described by referring to FIG. 1.

The first embodiment is a gas engine 1 using a gas fuel such as natural gas, which is a single cylinder or multicylinder precombustion chamber type gas engine applicable to a cogeneration system. The combustion chamber of the gas engine 1 comprises a main combustion chamber 1A formed in a cylinder and a precombustion chamber 1B formed in a cylinder head 43 communicating with the main combustion chamber 1A through a communication port 46. The precombustion chamber 1B to which reformed gas fuel is supplied is communicated to the main combustion chamber 1A by the opening of the communication port 46 by a control valve 44. In this gas engine, the reformed fuel is supplied to the precombustion chamber 1B from a reformed fuel supply passage 9 by a fuel valve 45 in the precombustion chamber 1B by opening a fuel supply port 47. Next, the air blown into the precombustion chamber 1B from the main combustion chamber 1A when the communication port 46 of the valve 44 opens mixes with the reformed fuel, and the resulting air-fuel mixture ignites in the precombustion chamber 1B with the result that the flame and unburned mixture are blown out from the precombustion chamber 1B into the main combustion chamber 1A where they completes a secondary combustion, pushing down a piston 51 by the force of the burning gas to drive the engine 1.

The gas engine 1 includes a turbocharger 3 driven by the thermal energy of the exhaust gas discharged from the main combustion chamber 1A through an exhaust passage 8; a $CO_2$ delivery device 4 provided in an exhaust passage 8A downstream of the turbocharger 3 and forming a $CO_2$ supply device; an energy recovery turbine 5 using the exhaust gas and steam as a drive power source and having a turbine 28 driven by the thermal energy of the exhaust gas discharged from a turbine 23 of the turbocharger 3; a heat exchanger 6 using thermal energy of the exhaust gas from the turbine 28 of the energy recovery turbine 5 to produce hot steam; a steam turbine 27 provided to the energy recovery turbine 5 and driven by the steam from the heat exchanger 6; and a $CO_2$ dissolving device 7 forming a $CO_2$ supply device and capable of introducing the exhaust gas from the energy recovery turbine 5.

The gas engine 1 has a fuel tank 11 accommodating a natural gas fuel having $CH_4$ as a main component; a catalyst reactor 2 arranged in the exhaust passage 8 for the exhaust gas from the main combustion chamber 1A and converting a mixture gas of $CH_4$ and $CO_2$ into a reformed fuel of CO and $H_2$ through thermal decomposition using the thermal energy of the exhaust gas; a natural gas supply pump 12, a gas fuel supply device, to supply natural gas from the fuel tank 11 to the catalyst reactor 2; a $CO_2$ supply device separating $CO_2$ contained in the exhaust gas and transferring it to the catalyst reactor 2; and a fuel pressurizing pump 13 of a reformed fuel supply device to supply a reformed fuel to the main combustion chamber 1A.

Further the gas engine 1 is a multicylinder engine having an exhaust manifold 31 to discharge the exhaust gas from the main combustion chamber 1A and an intake manifold 32 to supply an intake air to the main combustion chamber 1A. The intake air from an intake passage 10 is supplied to the main combustion chamber 1A through the intake manifold 32. The exhaust gas from each main combustion chamber 1A is gathered in the exhaust manifold 31 and discharged to the exhaust passage 8. The reformed fuel from the natural gas to be supplied to the main combustion chamber 1A is supplied by the fuel pressurizing pump 13 through the reformed fuel supply passage 9 to the respective main combustion chambers 1A.

The $CO_2$ supply device includes a $CO_2$ dissolving device 7 accommodating a solution that dissolves $CO_2$ contained in low-temperature exhaust gas from the exhaust passage 8D; a $CO_2$ delivery device 4 installed in the exhaust passage 8A-through which high-temperature exhaust gas flows-to accommodate the solution containing $CO_2$ dissolved by the $CO_2$ dissolving device 7, release $CO_2$ from the solution by heating it with the high-temperature exhaust gas, and send the released $CO_2$ to the catalyst reactor 2; and a circulation pump 14 to circulate the solution between the $CO_2$ dissolving device 7 and the $CO_2$ delivery device 4.

The solvent in the $CO_2$ dissolving device 7 arranged in the low-temperature region of the exhaust gas to dissolve $CO_2$ is β-aminoethyl alcohol ($2HOC_2H_4NH_2$), and the solution in the $CO_2$ delivery device 4 arranged in the high-temperature region of the exhaust gas to release $CO_2$ is β-oxyethyl ammonium carbonate $[(HOC_2H_4NH_3)_2CO_3]$.

The chemical formula in the $CO_2$ supply device is as follows.

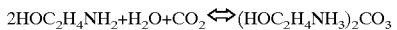

$$2HOC_2H_4NH_2 + H_2O + CO_2 \Leftrightarrow (HOC_2H_4NH_3)_2CO_3$$

In the above formula, the reaction proceeds to the right (β-aminoethyl alcohol) by absorbing $CO_2$ in the low temperature range and, in the high temperature range, proceeds to the left (β-oxyethyl ammonium carbonate) by releasing $CO_2$. The β-aminoethyl alcohol (solvent) absorbs $CO_2$ in the low temperature range to form β-oxyethyl ammonium carbonate (solution), which is supplied by the circulation pump 14 to the $CO_2$ delivery device 4 where it is heated to release $CO_2$. The solution that has released $CO_2$, i.e., β-aminoethyl alcohol, and $H_2O$ are collected to the $CO_2$ dissolving device 7.

The $CO_2$ delivery device 4 is a kind of a gas phase-liquid phase heat exchanger, and has a construction in which exhaust gas passages are arranged in a solution containing a solvent which, when heated, will release $CO_2$. The exhaust gas flowing through the exhaust gas passages in the $CO_2$ delivery device 4 heats the solution to high temperatures causing it to release $CO_2$. The released $CO_2$ is then sent to the catalyst reactor 2 through the $CO_2$ supply passage 17. The solvent that has released $CO_2$ is sent through a solvent recovery passage 16, where it is cooled, to the $CO_2$ dissolving device 7.

Further, the $CO_2$ dissolving device 7 dissolves $CO_2$ of the exhaust gas in the solvent to form a solution 37, with $N_2$ and $H_2O$ (water vapor at over 100° C.) contained in the exhaust gas released into the atmosphere through an exhaust port 36. The $CO_2$ dissolving device 7, which has received the solution 37, has its exhaust passage 8D open to allow the exhaust gas to be blown into the solution 37. With the exhaust gas blown into the solution 37, $CO_2$ of the exhaust gas dissolves into the solvent, while $N_2$ and $H_2O$ gases do not dissolve in the medium and are released from the exhaust port 36 out into the atmosphere. Hence, the exhaust gas released from the gas engine into the open air contains almost no $CO_2$ causing no air pollution. The solution 37 containing dissolved $CO_2$ is then supplied through a $CO_2$-containing solution supply passage 15 to the $CO_2$ delivery device 4 by the circulation pump 14.

The catalyst reactor 2 uses Ni or Pt as a catalyst. The catalyst reactor 2 is located at the merging portion of the exhaust manifold 31, and the exhaust gas discharged from the main combustion chamber 1A is at around 900° C. in a high-temperature range over about 800° C. The catalyst reactor 2 forms a kind of gas phase-to-gas phase heat exchanger, which has arranged in exhaust gas passages 35 for exhaust gas a gas fuel passage 33 filled with a catalyst 34 of Ni or Pt through which a gas fuel flows. The catalyst reactor 2 is a heat exchanger installed in the exhaust passage 8. The heat exchanger comprises the gas fuel passage 33 containing a porous member coated at its surface with the catalyst 34, the catalyst being incorporated inside the separation wall between the passages through which the exhaust gas flows.

The high-temperature exhaust gas from the main combustion chamber 1A flowing through the exhaust gas passages 35 in the catalyst reactor 2 heats the gas fuel passage 33 filled with the catalyst 34 of Ni or Pt. The gas mixture of $CH_4$ and $CO_2$ flowing through the gas fuel passage 33 heated to over approximately 800° C. contact the catalyst with the result that $CH_4$ is thermally decomposed into CO and $H_2$ and $CO_2$ into CO, transforming the gas fuel into the reformed fuel of CO and $H_2$. Next, the reformed fuel transformed from the natural gas is supplied by the fuel pressurizing pump 13 through the reformed fuel supply passage 9 and the intake manifold 32 into the respective main combustion chambers 1A.

Because the gas engine 1 is constructed in a heat insulating structure made of a ceramic member and a heat insulating layer, the exhaust gas discharged from the main combustion chambers 1A through the exhaust manifold 31 is at an elevated temperature of around 900–800° C. In the gas engine 1, the thermal energy of the exhaust gas is used for the thermal decomposition reaction in the catalyst reactor 2 and then recovered by the turbocharger 3, the energy recovery turbine 5 and the heat exchanger 6.

In the gas engine 1, the turbocharger 3 is installed in the exhaust passage 8 downstream of the catalyst reactor 2; the $CO_2$ delivery device 4 that constitutes the $CO_2$ supply device is installed in the exhaust passage 8A downstream of the turbine 23 of the turbocharger 3; the energy recovery turbine 5 is installed in the exhaust passage 8B downstream of the $CO_2$ delivery device 4; and the heat exchanger 6 for generating steam is located in the exhaust passage 8C downstream of the turbine 28 of the energy recovery turbine 5.

Figure 2:
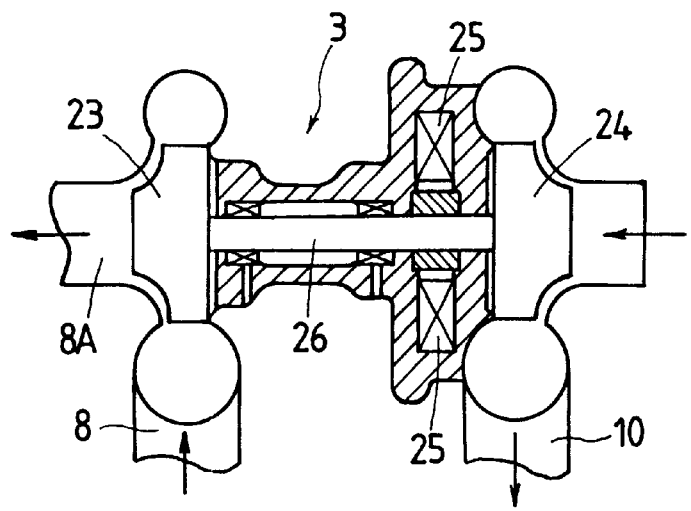
FIG. 2 is a schematic diagram showing a turbocharger incorporated in the gas engine of FIG. 1.

The turbocharger 3, as shown in FIG. 2, comprises a turbine 23 driven by the exhaust gas, a compressor 24 connected to the turbine 23 through a shaft 26 and driven by the turbine 23, and a generator-motor 25 mounted on the shaft 26. The compressor 24 is driven by the turbine 23 to pressurize air and supply the compressed air through the intake passage 10 and the intake manifold 32 into the respective main combustion chambers 1A. The generator-motor 25 extracts the rotating force of the turbine 23 in the form of electric power thereby recovering the exhaust gas energy.

Figure 3:
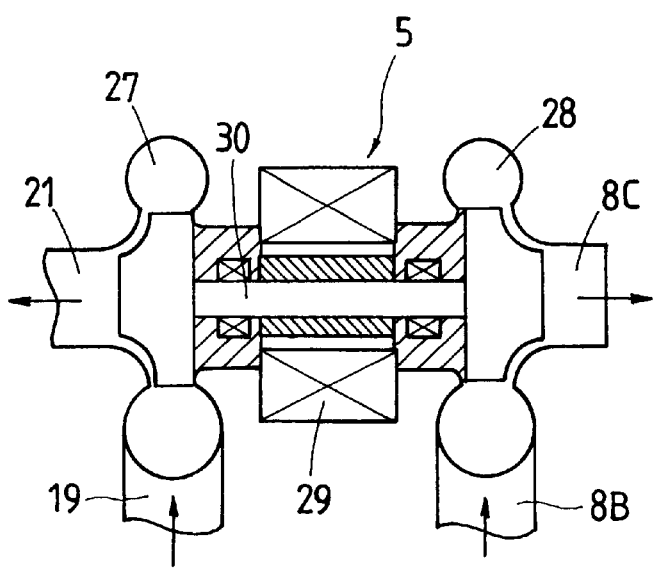
FIG. 3 is a schematic diagram showing an energy recovery turbine incorporated in the gas engine of FIG. 1.

The energy recovery turbine 5, as shown in FIG. 3, includes a turbine 28 driven by the exhaust gas, a steam turbine 27 driven by the steam produced by the heat exchanger 6, and a generator 29 mounted on a shaft 30. Hence, the exhaust gas energy drives the turbine 28 and the steam energy drives the steam turbine 27, the rotating forces of these turbines being recovered as electricity by the generator 29. The heat exchanger 6 provided in the exhaust passage 8C is a gas phase-to-liquid phase heat exchanger, which produces high-temperature steam using the exhaust gas energy. The high-temperature steam is fed through the steam passage 19 to the steam turbine 27 to drive it. The steam that has driven the steam turbine 27 flows as a fluid of water and low-temperature steam through a fluid passage 21 to the condenser 20 where it is transformed into high-temperature water which is then returned to the heat exchanger 6 through a water passage 22. The exhaust gas that has passed through the heat exchanger 6 is now low-temperature exhaust gas (at around 100° C.) whose thermal energy is almost recovered and which is then blown into the solution 37 in the $CO_2$ dissolving device 7.

The solvent in the $CO_2$ dissolving device 7 to dissolve $CO_2$ may use diethanolamine in addition to the above β-aminoethyl alcohol. Diethanolamine [$(HOCH_2CH_2)NH$] has characteristics of absorbing $CO_2$ at low temperature and releasing $CO_2$ at high temperature, as does β-aminoethyl alcohol. With the use of diethanolamine, too, the $CO_2$ delivery device 4 can, as described above, release $CO_2$ and send it to the catalyst reactor 2, which in turn thermally decomposes the gas mixture of $CH_4$ and $CO_2$ contained in the natural gas into CO and $H_2$ with the aid of the catalyst. The exhaust gas is removed of $CO_2$ when it is blown into the $CO_2$ dissolving device 7 containing the solvent of diethanolamine and then released into the atmosphere as a very clean exhaust gas consisting of $N_2$ and $H_2O$ (water vapor at more than 100° C.) gases.

Figure 4:
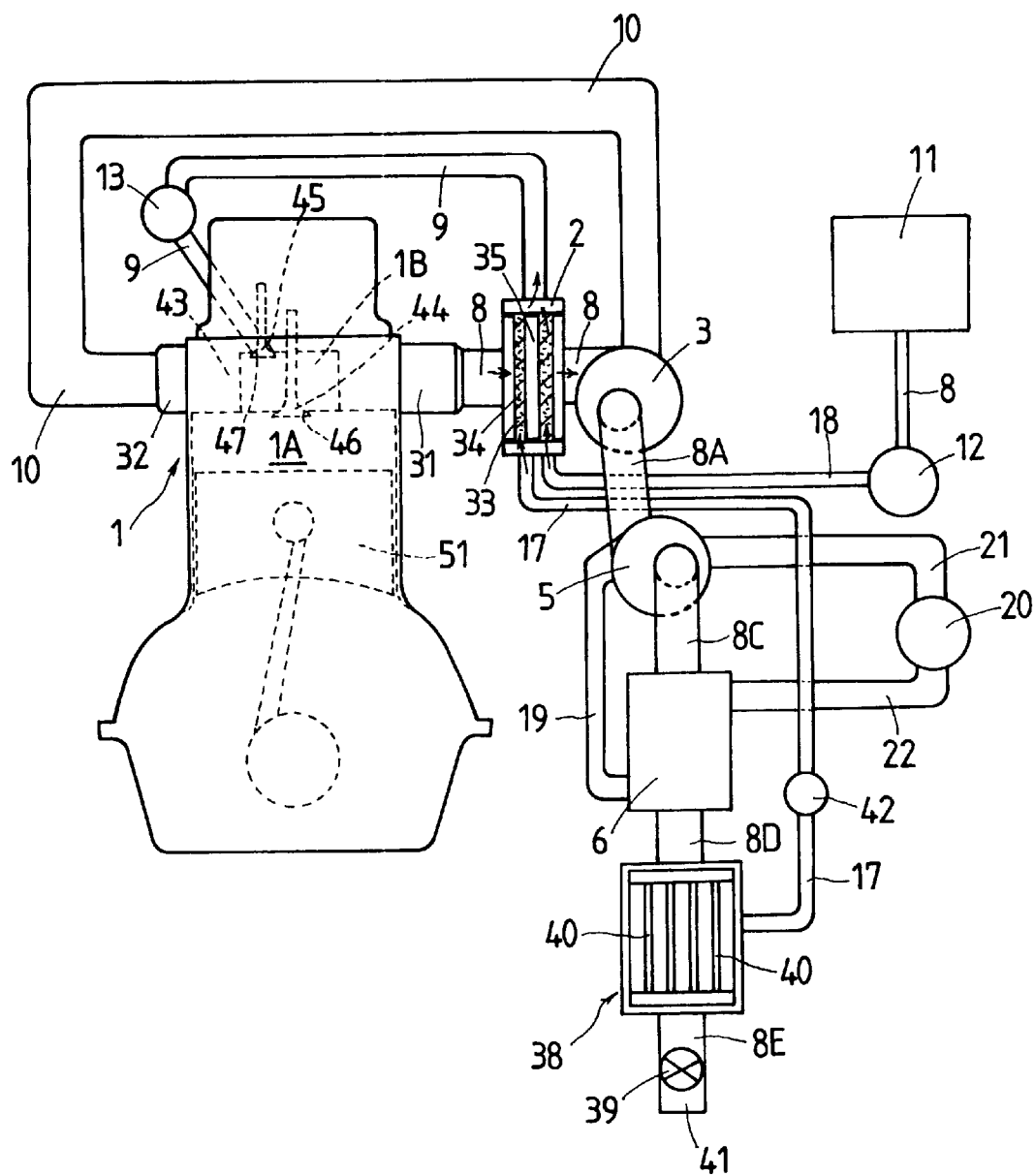
FIG. 4 is another embodiment of the gas engine with a gas fuel reforming device of this invention.

Next, by referring to FIG. 4, let us explain about the second embodiment of the gas engine having a gas fuel reforming device of this invention.

The second embodiment has a virtually similar construction to the first embodiment except for the $CO_2$ extracting system. Thus, components having identical functions with those of the first embodiment are assigned like reference numerals and their explanations are not repeated.

The gas engine 1 of the second embodiment differs from the first embodiment in the $CO_2$ supply device. The $CO_2$ supply device comprises a $CO_2$ separation device or separator 38 which is installed in an exhaust passage 8D to pass the low-temperature exhaust gas and which accommodates a $CO_2$ separation membrane 40. The exhaust gas is supplied from the exhaust passage 8D to the $CO_2$ separation device 38 that separates $CO_2$ from the exhaust gas by the $CO_2$ separation membrane 40. The separated $CO_2$ is then delivered by a $CO_2$ supply pump 42 through the $CO_2$ supply passage 17 to the catalyst reactor 2. The $CO_2$ separation membrane 40 accommodated in the $CO_2$ separation device 38 is formed of a polytetrafluoroethylene membrane, or an inorganic separation membrane made of alumina-, silica- and zeolite-based porous ceramics. The $CO_2$ separation membrane 40 is one form of a filter membrane, which works as a filtering device in which molecules pass through clearances between chains of high molecule materials and which prevents $N_2$ and $H_2O$ (water vapor) with large molecular diameters from passing through and allows $CO_2$ with smaller molecular diameters to pass through. The $CO_2$ supply pump 42 delivers the filtered $CO_2$ through the $CO_2$ supply passage 17 to the catalyst reactor 2.

In the $CO_2$ separation device 38, $N_2$ and $H_2O$ gases that failed to pass through the $CO_2$ separation membrane 40 are released from the exhaust passage 8E into the atmosphere. Provided in the exhaust passage 8E is a pressure control valve 39 that controls the pressure of the exhaust gas to be released into the atmosphere, thereby controlling the trapping of $CO_2$ by the $CO_2$ separation membrane 40 in the $CO_2$ separation device 38.

To enhance its $CO_2$ separation performance, the $CO_2$ separation membrane 40 may be formed of a polytetrafluoroethylene membrane with good transmissivity bonded with ethylenediamine, which has a characteristic of promoting the transport of $CO_2$. Ethylenediamine reacts with $CO_2$, as shown in the following formula, to increase the amount of $CO_2$ taken into the $CO_2$ separation membrane 40.

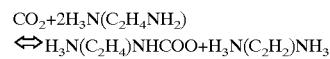

Figure 5:
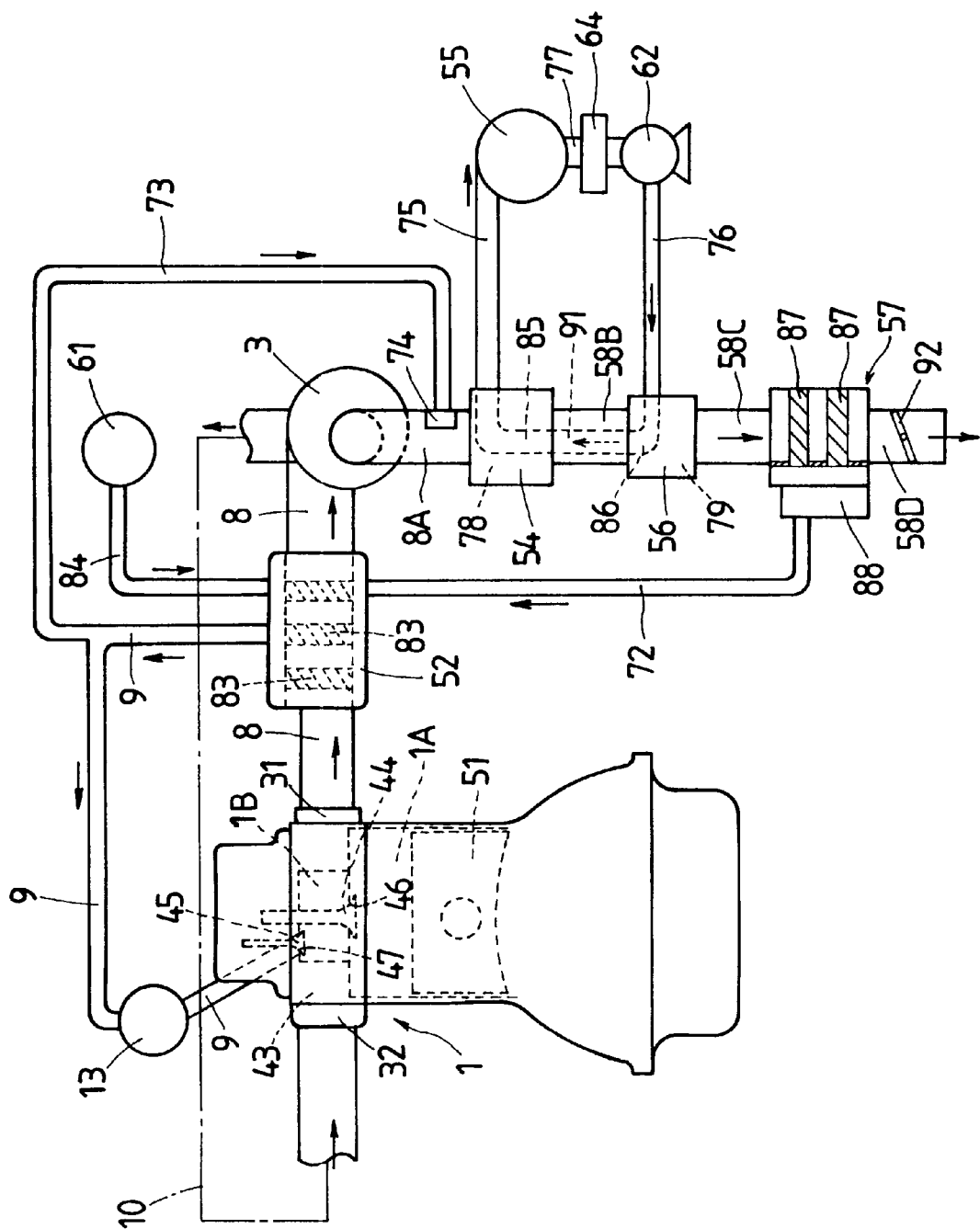
FIG. 5 is still another embodiment of the gas engine with a natural gas reforming device of this invention.

Next, by referring to FIG. 5, the third embodiment of the gas engine with a natural gas reforming device of this invention will be described. The third embodiment, when compared with the first embodiment, can be applied to a case where the gas engine and the turbocharger have the same construction. Hence, the same components are assigned the identical reference numbers and their repeated explanations are not given.

The gas engine 1 has, in particular, a natural gas reforming device which includes a catalyst reactor 52 installed in the exhaust passage 8 which, in the presence of $CO_2$, converts $CH_4$ of the natural gas into the reformed fuel by using the thermal energy of the exhaust gas discharged from the main combustion chamber 1A through the exhaust passage 8. In the exhaust passage 8 downstream of the catalyst reactor 52, a turbocharger 3 driven by the exhaust gas is provided. The gas engine 1 includes a fuel tank 61 accommodating a natural gas fuel having $CH_4$ as the main component; a fuel pressurizing pump 13 forming a reformed fuel supply device to supply the reformed fuel to a precombustion chamber 1B; a first-stage heat exchanger 54 provided in the exhaust passage 8A downstream of the turbocharger 3; a steam turbine 55 driven by the steam generated by the first-stage heat exchanger 54; a second-stage heat exchanger 56 installed in an exhaust passage 58B downstream of the first-stage heat exchanger 54 to convert a fluid (low-temperature steam and water) discharged from the steam turbine 55 into steam and to supply the converted steam to the first-stage heat exchanger 54; and a $CO_2$ supply device 57 to supply $CO_2$ separated from the exhaust gas to the catalyst reactor 52. The $CO_2$ supply device 57 comprises a $CO_2$ separation membrane 87 installed in an exhaust passage 58C downstream of the second-stage heat exchanger 56 to separate $CO_2$ from the exhaust gas and a supply pump 88 to deliver $CO_2$ separated from the exhaust gas to the catalyst reactor 52.

In the gas engine 1, the exhaust gas released from the $CO_2$ supply device 57 out into the atmosphere is almost an $N_2$ gas with little $CO_2$ and hence does not contribute to air pollution that deteriorates the environment. The catalyst reactor 52 uses Ni or Pt as a catalyst to react $CH_4$ with $CO_2$ to convert them into CO and $H_2$ by thermal decomposition. The catalyst reactor 52 is installed at the merging portion of the exhaust manifold 31 and the exhaust gas discharged from the main combustion chamber 1A is at a high temperature of around 900–800° C., high enough to reform $CH_4$ by thermal decomposition. The catalyst reactor 52 is a catalyst device with a heat exchange function, which includes exhaust gas passages through which the exhaust gas flows and gas fuel passages containing a porous member coated with a catalyst 83 such as Ni and Pt, inside the partition walls of the exhaust gas passages. The catalyst reactor 52 constitutes a kind of gas phase-to-gas phase heat exchanger. The catalyst reactor 52 is installed in the exhaust passage 8 and has gas fuel passages loaded with a porous member coated at its surface with the catalyst 83 that is incorporated inside the partition wall between the exhaust gas passages through which the exhaust gas flows.

The high-temperature exhaust gas from the main combustion chamber 1A, as it flows through the exhaust gas passages in the catalyst reactor 52, heats the gas fuel passage filled with the catalyst 83 such as Ni and Pt. When the gas mixture of $CH_4$ and $CO_2$ flowing through the gas fuel passage, which is heated to about 800° C. or higher, contacts the catalyst 83, $CH_4$ is thermally decomposed into CO and $H_2$ and $CO_2$ into CO, converting the gas mixture into a reformed fuel of CO and $H_2$. Next, the reformed fuel, which was converted from the natural gas, is supplied by the fuel pressurizing pump 13 through the reformed fuel supply passage 9 and the intake manifold 32 to the respective precombustion chambers 1B in the cylinders.

Because the main combustion chamber 1A and the precombustion chamber 1B in the gas engine 1 are formed in a heat insulating structure made of a ceramics member and a heat insulating layer, the exhaust gas discharged from the main combustion chamber 1A through the exhaust manifold 31 is high-temperature gas at around 900–800° C. In the gas engine 1, the thermal energy of the exhaust gas, after being used by the catalyst reactor 52 for thermal decomposition, is recovered by the turbocharger 3, the first-stage heat exchanger 54 and the second-stage heat exchanger 56.

The third embodiment can use the turbocharger 3 of FIG. 2 and thus its explanations are omitted.

The first-stage heat exchanger 54 comprises steam passages 85 and exhaust gas passages 78. The steam passages 85 are installed in a first casing and contains a porous ceramic member through which the steam heated by the second-stage heat exchanger 56 flows. The exhaust gas passages 78 are arranged around the steam passages 85 and contains porous ceramic members through which the exhaust gas flows. The second-stage heat exchanger 56 comprises water-steam passages 86 and exhaust gas passages 79. The water-steam passages 86 are installed in a second casing adjacent to the first casing and contain porous ceramic members through which the steam flows and which can retain water. The exhaust gas passages 79 are arranged around the water-steam passages 86 and contains a porous ceramic member through which the exhaust gas from the first-stage heat exchanger 54 flows.

In the exhaust passage 8A downstream of the turbocharger 3 and upstream of the first-stage heat exchanger 54 there is provided a fuel nozzle 74 that sprays the reformed fuel fed from the catalyst reactor 52. The reformed fuel is supplied from the catalyst reactor 52 to the fuel nozzle 74 by an auxiliary fuel supply passage 73.

Figure 6:
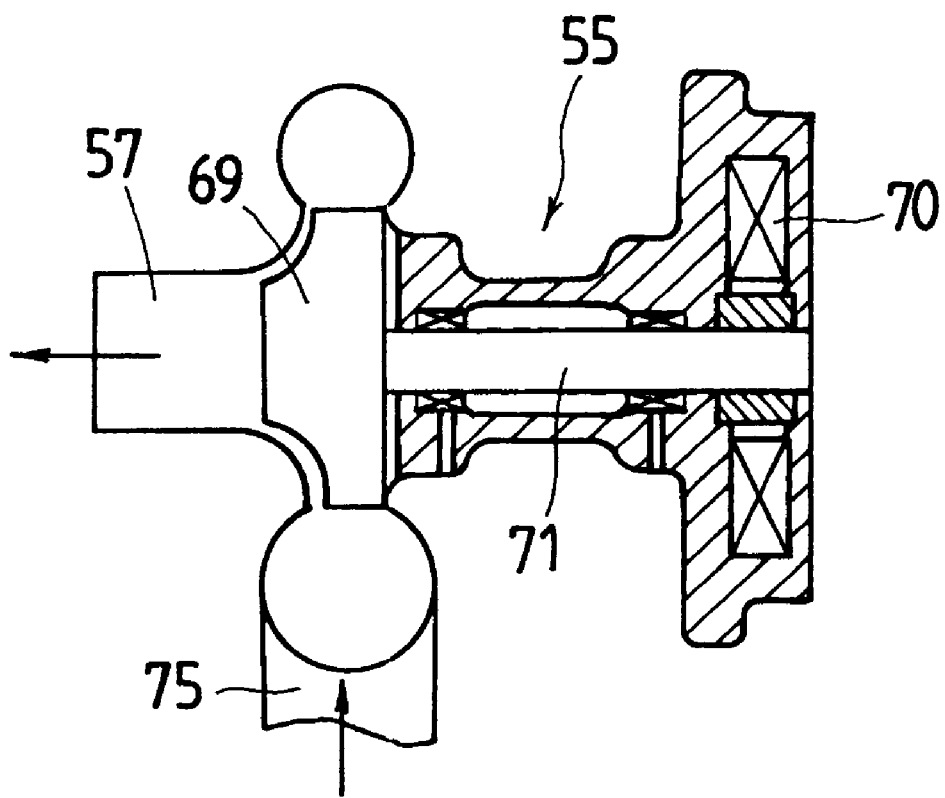
FIG. 6 is a steam turbine incorporated in the gas engine of FIG. 5.

The steam turbine 55, as shown in FIG. 6, comprises a turbine 69 driven by the steam produced by the first-stage heat exchanger 54 and a generator 70 mounted on a shaft 71. Thus, the steam energy drives the turbine 69, whose rotating force is recovered as an electric power by the generator 70. The second-stage heat exchanger 56 provided in the exhaust passage 58B is a gas phase-to-liquid phase heat exchanger that uses the exhaust gas energy to generate steam, which is sent through a steam passage 91 to the first-stage heat exchanger 54. The steam that has driven the steam turbine 55 flows as a fluid of low-temperature steam (water-containing steam) through a fluid passage 77 to a condenser 64, where it is converted into high-temperature water which is then returned by a water pump 62 through a water passage 76 to the second-stage heat exchanger 56. The exhaust gas that has passed through the second-stage heat exchanger 56 becomes low-temperature exhaust gas (at around 200° C.) whose thermal energy has mostly been recovered and which will be sent to the $CO_2$ supply device 57.

The $CO_2$ supply device 57 accommodates, for example, a plurality of rodlike $CO_2$ separation membranes 87 arranged in the exhaust passage 58C through which the low-temperature gas flows. The exhaust gas transferred through the exhaust passage 58C to the $CO_2$ supply device 57 is filtered by the $CO_2$ separation membranes 87 that separate $CO_2$ from the exhaust gas, with components such as $N_2$, $O_2$ and $H_2O$ that failed to pass through the $CO_2$ separation membranes 87 bypassing these separation membranes and discharged into the exhaust passage. The separated $CO_2$ is supplied to the catalyst reactor 52 through a $CO_2$ supply passage 72 by the $CO_2$ supply pump 88. The $CO_2$ separation membranes 87 installed in the $CO_2$ supply device 57 are a ceramic porous body of inorganic separation membranes made of alumina-, silica- and zeolite-based porous ceramics. These separation membranes are a kind of filter membrane that passes $CO_2$ with small molecular diameters. and blocks $N_2$, $O_2$ and $H_2O$ (water vapor) with large molecular diameters. The $CO_2$ is then supplied by the $CO_2$ suction supply pump 88 through the $CO_2$ supply passage 72 to the catalyst reactor 52.

In the $CO_2$ supply device 57, $N_2$ and $H_2O$ (water vapor) that failed to pass through the $CO_2$ separation membranes 87 are released from an exhaust passage 58D into the atmosphere. The exhaust passage 58D is provided, for example, with a pressure control valve 92, which controls the pressure of the exhaust gas to be released into the open air and therefore the amount of $CO_2$ taken in by the $CO_2$ suction supply pump 88 through the $CO_2$ separation membranes 87 in the $CO_2$ supply device 57.

The gas engine with this natural gas reforming device is constructed as described above and works as follows.

With a control valve 44 closed, the air is supplied into the main combustion chamber 1A from the compressor 24 of the turbocharger 3 through the intake passage 10 and the intake manifold 32 upon the opening of the intake valve (not shown). The air in the main combustion chamber 1A is compressed during the compression stroke, with the control valve 44 still closed. The natural gas fuel is supplied from the fuel tank 61 through a natural gas supply passage 84 to the catalyst reactor 52 where it is converted into a reformed fuel. At the same time, with the control valve 44 closed, the fuel valve 45 is opened and the fuel pressurizing pump 13 is activated to supply the reformed fuel from the catalyst reactor 52 through the reformed fuel supply passage 9 to the precombustion chamber 1B. The control valve 44 is now opened near the top dead center during the compression stroke, allowing the compressed air in the main combustion chamber 1A to flow into the precombustion chamber 1B and mix with the reformed fuel, igniting and burning the air-fuel mixture to perform the work on the piston 51 during the power stroke.

In the exhaust stroke, the exhaust gas of the main combustion chamber 1A and the precombustion chamber 1B is discharged through the exhaust passage 8. The high-temperature exhaust gas, as it passes through the catalyst reactor 52, converts the natural gas into a reformed fuel by its thermal energy and is then sent to the turbocharger 3. The turbocharger 3 now drives the turbine 23 whose rotating force is converted by the generator-motor 25 into an electric energy and also drives the compressor 24. The electric power obtained by the generator-motor 25 is stored in a battery or consumed for driving auxiliary equipment. The compressor 24 supplies air through the intake passage 10 to the main combustion chamber 1A. The exhaust gas that has passed through the turbine 23 of the turbocharger 3 is sent through the exhaust passage 8A to the first-stage heat exchanger 54.

The exhaust passage 8A is provided with the fuel nozzle 74 that sprays into the exhaust passage 8A a part of the reformed fuel supplied from the catalyst reactor 52 through the auxiliary fuel supply passage 73. Because the exhaust gas flowing through the exhaust passage 8A contains a large amount of $O_2$, the reformed fuel injected from the fuel nozzle 74 ignites and burns increasing enthalpy of the exhaust gas. The exhaust gas fed into the first-stage heat exchanger 54 flows through the exhaust gas passages 78 and then through the exhaust passage 58B into the second-stage heat exchanger 56. The exhaust gas, as it passes through the exhaust gas passages 78, exchanges heat with the steam that was sent from the second-stage heat exchanger 56 through the steam passages 91 to the steam passages 85 to heat the steam to high temperatures.

The steam heated to high temperatures in the first-stage heat exchanger 54 is sent through the high-temperature steam passage 75 to the steam turbine 55 which drives the turbine 69 to cause the generator 70 to generate electricity. The electricity produced by the generator 70 is stored in a battery or consumed for driving auxiliary equipment. The high-temperature steam, after driving the steam turbine 55, is converted into a fluid of low-temperature steam and water, which is then delivered through the fluid passage 77 to the condenser 64 where it is condensed into water, which is supplied by the water pump 62 through the water passage 76 to the water-steam passage 86 in the second-stage heat exchanger 56.

The exhaust gas transferred from the first-stage heat exchanger 54 to the second-stage heat exchanger 56 flows through the exhaust gas passages 79 to the exhaust passage 58C. The exhaust gas, as it passes through the exhaust gas passages 79, transforms water flowing through the water-steam passages 86 into steam by heat exchange. Because its thermal energy is already recovered by the catalyst reactor 52, the turbocharger 3, the first-stage heat exchanger 54 and the second-stage heat exchanger 56, the exhaust gas delivered to the exhaust passage 58C has its temperature reduced down to about 200° C. and thus does not damage the $CO_2$ separation membranes 87 when it is fed into the $CO_2$ supply device 57. The exhaust gas delivered into the $CO_2$ supply device 57 passes through the $CO_2$ separation membranes 87 to be cleared of $CO_2$. The separated $CO_2$ is then delivered by the $CO_2$ suction supply pump 88 from the $CO_2$ supply device 57 through the $CO_2$ supply passage 72 to the catalyst reactor 52. Filtering the exhaust gas through the $CO_2$ separation membranes 87 separates $CO_2$ from the exhaust gas, and the exhaust gas from which $CO_2$ is separated includes such components as $N_2$ and $H_2O$ with the reduced content of $CO_2$ and is released from the exhaust passage 58D out into the atmosphere.

What is claimed is:

1. A gas engine with a gas fuel reforming device, comprising:

a fuel tank containing a natural gas fuel having $CH_4$ as a major component;

an exhaust passage to discharge exhaust gas from combustion chambers;

a catalyst reactor installed in the exhaust passage to thermally decompose a gas mixture of $CH_4$ and $CO_2$ into a reformed fuel of CO and $H_2$ by using thermal energy of the exhaust gas;

a gas fuel supply device to supply the natural gas fuel from the fuel tank to the catalyst reactor;

a $CO_2$ supply device to supply to the catalyst reactor $CO_2$ separated from the exhaust gas by a $CO_2$ separator; and a reformed fuel supply device to supply the reformed fuel to the combustion chambers;

wherein the combustion chambers are formed in a heat insulating structure of a ceramic member.

2. A gas engine according to claim 1, wherein the $CO_2$ supply device comprises: a $CO_2$ dissolving device of the $CO_2$ separator containing a solution to dissolve $CO_2$ of a cooled, low-temperature exhaust gas; a $CO_2$ delivery device installed in the exhaust passage through which high-temperature exhaust gas discharged from the combustion chambers flows, the $CO_2$ delivery device being able to release $CO_2$ from the solution, in which $CO_2$ was dissolved by the $CO_2$ dissolving device, by heating the solution with the high-temperature exhaust gas, the $CO_2$ delivery device being able to accommodate the solution and send the released $CO_2$ to the catalyst reactor; and a circulation pump to circulate the solution between the $CO_2$ dissolving device and the $CO_2$ delivery device.

3. A gas. engine according to claim 2, wherein a solvent in the $CO_2$ dissolving device that absorbs $CO_2$ of the exhaust gas is β-aminoethyl alcohol and the solution in the $CO_2$ delivery device that releases $CO_2$ is β-oxyethyl ammonium.

4. A gas engine according to claim 2, wherein the solvent in the $CO_2$ dissolving device that dissolves $CO_2$ is diethanolamine.

5. A gas engine according to claim 1, wherein the $CO_2$ dissolving device dissolves $CO_2$ of the exhaust gas in a solvent to form a solution and releases $N_2$ and $H_2O$ of the exhaust gas out into the atmosphere.

6. A gas engine according to claim 1, wherein the $CO_2$ supply device supplies to the catalyst reactor $CO_2$ which was separated from the exhaust gas by a $CO_2$ separation membrane of the $CO_2$ separator arranged in the exhaust passage through which low-temperature exhaust gas flows.

7. A gas engine according to claim 6, wherein the $CO_2$ separation membrane in the $CO_2$ supply device is a polytetrafluoroethylene membrane.

8. A gas engine according to claim 6, wherein the $CO_2$ separation membrane in the $CO_2$ supply device is a polytetrafluoroethylene membrane bonded with ethylenediamine to enhance a $CO_2$ filtering performance.

9. A gas engine according to claim 6, wherein the $CO_2$ separation membrane is an inorganic separation membrane made of alumina-, silica- and zeolite-based porous ceramics.

10. A gas engine according to claim 1, wherein the catalyst reactor uses Ni or Pt as a catalyst.

11. A gas engine according to claim 1, wherein the catalyst reactor is a heat exchanger installed in the exhaust passage, and the heat exchanger comprises exhaust gas passages through which the exhaust gas flows and gas fuel passages that contains porous members coated at their surfaces with the catalyst, the catalyst being incorporated inside separation walls between the exhaust gas passages.

12. A gas engine according to claim 1, wherein a turbocharger is installed in the exhaust passage downstream of the catalyst reactor, an energy recovery turbine is installed in the exhaust passage downstream of the turbocharger, and a heat exchanger is installed in the exhaust passage downstream of the energy recovery turbine to generate steam.

13. A gas engine according to claim 1, wherein the catalyst reactor includes a heat exchanger comprising an exhaust gas passage and a gas fuel passage.

14. A gas engine with a natural gas reforming device, comprising:
a fuel tank containing a natural gas fuel having $CH_4$ as a major component;
a catalyst reactor installed in an exhaust passage to thermally decompose $CH_4$ supplied from the fuel tank into a reformed fuel by using exhaust gas discharged from combustion chambers;
a reformed fuel supply device to supply the reformed fuel to the combustion chambers;
a turbocharger installed in the exhaust passage downstream of the catalyst reactor;
a first-stage heat exchanger installed in the exhaust passage downstream of the turbocharger;
a steam turbine driven by steam generated by the first-stage heat exchanger;
a condenser to convert steam discharged from the steam turbine into water;
a second-stage heat exchanger installed in the exhaust passage downstream of the first-stage heat exchanger to convert water delivered from the condenser into steam and supply the steam to the first-stage heat exchanger; and
a $CO_2$ supply device to separate $CO_2$ from the exhaust gas by a $CO_2$ separation membrane installed in the exhaust passage downstream of the second-stage heat exchanger and to supply the separated $CO_2$ to the catalyst reactor.

15. A gas engine according to claim 14, wherein the $CO_2$ separation membrane is an inorganic separation membrane made of alumina-, silica- and zeolite-based porous ceramics.

16. A gas engine according to claim 14, wherein the catalyst reactor reacts $CH_4$ with $CO_2$ to thermally decompose them into CO and $H_2$ by using Ni or Pt as a catalyst.

17. A gas engine according to claim 14, wherein the catalyst reactor is a catalyst device having a heat exchange function, and comprises an exhaust gas passage through which the exhaust gas flows and a gas fuel passage containing a porous member coated at its surface with the catalyst, the catalyst being incorporated inside a partition wall of the exhaust gas passage.

18. A gas engine according to claim 14, wherein the first-stage heat exchanger comprises a steam passage installed in a first casing and containing porous ceramic members through which the steam heated by the second-stage heat exchanger flows, and an exhaust gas passage installed in the steam passage and containing porous ceramic members through which the exhaust gas flows.

19. A gas engine according to claim 14, wherein the second-stage heat exchanger comprises a water-steam passage installed in a second casing provided adjacent to the first casing and containing porous ceramic members through which steam flows, the water-steam passage being capable of retaining water, and an exhaust gas passage arranged around the water-steam passage and containing porous ceramic members through which the exhaust gas from the first-stage heat exchanger flows.

20. A gas engine according to claim 14, wherein the exhaust passage upstream of the first-stage heat exchanger is provided with a fuel nozzle to inject a part of the reformed fuel from the catalyst reactor.

21. A gas engine according to claim 14, wherein the combustion chambers are formed in a heat insulating structure of a ceramic member.

22. A gas engine with a gas fuel reforming device, comprising:
a fuel tank containing a natural gas fuel having $CH_4$ as a major component;
an exhaust passage to discharge exhaust gas from combustion chambers;
a catalyst reactor installed in the exhaust passage to thermally decompose a gas mixture of $CH_4$ and $CO_2$ into a reformed fuel of CO and $H_2$ by using thermal energy of the exhaust gas;
a gas fuel supply device to supply the natural gas fuel from the fuel tank to the catalyst reactor;
a $CO_2$ supply device to supply $CO_2$ separated from the exhaust gas to the catalyst reactor; and
a reformed fuel supply device to supply the reformed fuel to the combustion chambers;
wherein the $CO_2$ supply device comprises:
a $CO_2$ dissolving device containing a solution to dissolve $CO_2$ of a cooled, low-temperature exhaust gas;
a $CO_2$ delivery device installed in the exhaust passage through which high-temperature exhaust gas discharged from the combustion chambers flows, the $CO_2$ delivery device being able to release $CO_2$ from the solution, in which $CO_2$ was dissolved by the $CO_2$ dissolving device, by heating the solution with the high-temperature exhaust gas, the $CO_2$ delivery device being able to accommodate the solution and send the released $CO_2$ to the catalyst reactor; and
a circulation pump to circulate the solution between the $CO_2$ dissolving device and the $CO_2$ delivery device.

* * * * *